United States Patent
Eichenhofer et al.

(10) Patent No.: US 12,427,746 B2
(45) Date of Patent: **\*Sep. 30, 2025**

(54) FIBER-REINFORCED COMPOSITE DEVICE AND FORMING METHOD

(71) Applicant: 9T LABS AG, Zürich (CH)

(72) Inventors: Martin Eichenhofer, Zürich (CH); Giovanni Cavolina, Zürich (CH); Chester Houwink, Zürich (CH)

(73) Assignee: 9T Labs AG, Zürich (CH)

( * ) Notice: Subject to any disclaimer, the term of this patent is extended or adjusted under 35 U.S.C. 154(b) by 13 days.

This patent is subject to a terminal disclaimer.

(21) Appl. No.: 18/209,903

(22) Filed: Jun. 14, 2023

(65) Prior Publication Data
US 2023/0321945 A1    Oct. 12, 2023

Related U.S. Application Data (63) Continuation of application No. 17/789,435, filed as application No. PCT/IB2021/050015 on Jan. 4, 2021, now Pat. No. 11,884,053.

(30) Foreign Application Priority Data

Jan. 2, 2020 (WO) .................. PCT/IB2020/050013

(51) Int. Cl.
*B32B 5/12* (2006.01)
*B32B 3/02* (2006.01)
(Continued)

(52) U.S. Cl.
CPC .................. *B32B 5/12* (2013.01); *B32B 3/02* (2013.01); *B32B 5/024* (2013.01); *B32B 5/263* (2021.05);
(Continued)

(58) Field of Classification Search
CPC .. B32B 5/12; B32B 5/263; B32B 3/02; B32B 5/024; B32B 27/12; B32B 2260/046; B32B 2307/732; B32B 2398/20
See application file for complete search history.

(56) References Cited

U.S. PATENT DOCUMENTS 3,953,630 A * 4/1976 Roberts ............. B32B 17/10302
428/81
5,100,713 A  3/1992 Homma et al.
(Continued)

FOREIGN PATENT DOCUMENTS

EP     3372367     9/2018

OTHER PUBLICATIONS

The International Search Report and Written Opinion for International Application No. PCT/IB2021/050015 mailed Apr. 19, 2021 (8 pages).

*Primary Examiner* — Travis M Figg
(74) *Attorney, Agent, or Firm* — Dicke, Billig & Czaja, PLLC (57) ABSTRACT

A preformed material for use in fiber-reinforced composite materials, the preformed material including one or more fiber rovings including parallel fibers wherein the fiber rovings include one or more folds in a direction parallel to the direction of the fibers and wherein the unfolded width of the fiber rovings have a width included in a range from 0.3 mm to 5 mm. The fiber density by volume may be included in a range from 10% to 75% of fibers. The thickness of a fiber roving may be included in a range from 50 μm to 2 mm. The fiber rovings may include from 500 to 12000 fibers. The fiber rovings may include a thermoplastic polymer that forms a first bond within the one or more folds and a second bond between a first fiber roving and a second adjacent fiber roving.

24 Claims, 5 Drawing Sheets (51) Int. Cl.
*B32B 5/02* (2006.01)
*B32B 5/26* (2006.01)
*B32B 27/12* (2006.01)

(52) U.S. Cl.
CPC ........ *B32B 27/12* (2013.01); *B32B 2260/046* (2013.01); *B32B 2307/732* (2013.01); *B32B 2398/20* (2013.01)

(56) References Cited

U.S. PATENT DOCUMENTS

| | | | |
|---|---|---|---|
| 5,816,526 A * | 10/1998 | Bartelmuss | B65H 19/262 428/126 |
| 2005/0048858 A1* | 3/2005 | Wellman | B29C 70/86 428/297.4 |
| 2005/0074593 A1* | 4/2005 | Day | E04C 2/296 428/292.1 |
| 2007/0140861 A1 | 6/2007 | Wobben | |
| 2007/0264470 A1* | 11/2007 | Wellman | B29C 37/0085 428/105 |
| 2009/0050263 A1 | 2/2009 | Suzuki et al. | |
| 2010/0266833 A1* | 10/2010 | Day | B29C 44/1285 156/195 |
| 2011/0020595 A1* | 1/2011 | Kolax | B29C 70/086 428/116 |
| 2014/0248448 A1* | 9/2014 | Sjostedt | B32B 5/26 428/222 |
| 2018/0093431 A1* | 4/2018 | Forston | B32B 5/26 |
| 2021/0008815 A1* | 1/2021 | Huoponen | B29C 70/24 |
| 2021/0301096 A1* | 9/2021 | Ochi | B32B 38/08 |
| 2023/0045396 A1 | 2/2023 | Eichenhofer et al. | |

* cited by examiner

FIBER-REINFORCED COMPOSITE DEVICE AND FORMING METHOD

CROSS-REFERENCE TO RELATED APPLICATIONS

This application is a Continuation Application of Ser. No. 17/789,435, filed Jun. 27, 2022, entitled "FIBER-REINFORCED COMPOSITE DEVICE AND FORMING METHOD," now allowed, which claims priority under 35 U.S.C. § 371 to International Application No. PCT/162021/050015 filed Jan. 4, 2021, which claims the benefit of International Application No. PCT/162020/050013, filed Jan. 2, 2020, which are all incorporated herein by reference.

FIELD

The present invention relates to fiber-reinforced plastic composite materials and processes for manufacturing devices comprising fiber-reinforced plastic composite materials.

BACKGROUND

Fiber-reinforced plastics (FRP), also called fiber-reinforced polymers, for example carbon fiber-reinforced plastics (CFRP) are widely used materials for lightweight structures, ranging from sports equipment, to automotive components, to aircraft structures. A method for manufacturing of FRP's comprises depositing fiber tows, for example preimpregnated tows, for example tapes, onto a substrate. The depositing is, for example, done by a robot, for example a manipulator comprising a tape dispensing end effector for additive manufacturing. Depositing tapes imposes constraints on one or more of: the speed at which the tape is deposited, the trajectories described by the depositing end effector, the radius of curvature of the trajectories, the amount of adhesive polymer used, the amount of air trapped in the FRP, the fiber volume fraction inside the FRP, the deposition process temperature, the polymer's viscosity, the deposited layer's geometry, for example defined by its dimensions (for example defined by one or more of its length, width, and height), and the interleaving, juxtaposition, and superposition patterns of tapes, for example tape layers. There is therefore a need for fiber tows, for example preimpregnated tows, that enable their deposition at greater speed and greater homogeneity than can be achieved using conventional tape-laying techniques. There is a need to lay fiber tows over trajectories that comprise curves with small radii of curvature, and with improved and diversified fiber layout patterning capabilities. There is also a need for layouts, forming methods, and deposition methods for such tows. Such tows and related methods may, for example, increase the strength and quality of manufacturing fiber-reinforced polymer parts while reducing their cost.

SUMMARY

A problem in the field fiber-reinforced plastics relates to the speed at which one or more fiber rovings can be deposited to form a layout. Another problem relates to the precision of the layout. A further problem relates to the density of fibers within a given volume that can be achieved to confer strength to the resulting composite material. It is therefore an object of this disclosure to provide embodiments of preformed material rovings and roving assemblies, for example formed from fiber tows, as solutions to the problems of forming fiber-reinforced polymer parts at high speed, precision, fiber density, and strength. It is also an object of this disclosure to provide methods to form embodiments of preformed material rovings and roving assemblies from the fiber tows.

One embodiment of the present disclosure is created by providing a preformed material for use in fiber-reinforced composite materials, the preformed material comprising one or more fiber rovings comprising parallel fibers wherein the fiber rovings comprise one or more folds in a direction parallel to the direction of the fibers and wherein the unfolded width of the fiber rovings have a width comprised in a range from 0.3 mm to 5 mm.

For example, in the embodiment of the preformed material, the fiber rovings comprising one or more folds are selected from the group consisting of a one-fold roving, a gate-folded, a partly overlapping two-fold roving, a fully overlapping two-fold roving, an accordion fold roving, a double parallel-folded roving, and a gate-folded roving that comprises four folds. For example, the preformed material comprises one or more parallel paths or tracks of fiber rovings. For example, the preformed material comprises separate one or more fiber rovings that are parallel to each other. For example, one or more fiber rovings that comprise only one fold comprise a fold that is located about halfway of the unfolded width of the roving. For example, one or more fiber rovings that comprise only two folds comprise a first fold and a second fold that are at about equal distance from the roving's half-width point. For example, a cross-sectional cut through the preformed material orthogonally to the direction of the fibers of one or more of the one or more fiber rovings comprises one or more visible rovings comprising one or more folds.

In some embodiments of the preformed material, the fiber density by volume is comprised in a range from 10% to 75% of fibers. In some embodiments of the preformed material, the thickness of a fiber roving is comprised in a range from 50 μm to 2 mm. In some embodiments of the preformed material, the fiber density by volume within the cross-sectional area defined by the external contour of a fiber roving is comprised in a range from 20% to 75% of fibers. In some embodiments, the preformed material comprises one or more layers comprising one or more of the fiber rovings, each layer comprising an arrangement of adjacent and parallel fiber rovings. In some embodiments, the preformed material comprises one or more stacked layers comprising one or more of the fiber rovings, each layer comprising an arrangement of adjacent and parallel fiber rovings.

For example, the fiber rovings comprise from 500 to 12000 fibers. For example, the fiber rovings have a width in a range from 0.2 mm to 2.5 mm. For example, the fiber rovings comprise one or more fibers selected from the group consisting of carbon fibers, glass fibers, polyaramide fibers, rayon fibers, acrylic fibers, polypropylene fibers, polyamide fibers, polyester fibers, polyetheretherketone fibers, silicon carbide fibers, alumina fibers, and alumina-silica fibers. For example, one or more of the fiber rovings comprises a thermoplastic polymer that forms a first bond within the one or more folds and a second bond between a first fiber roving and a second adjacent fiber roving.

In some embodiments of the preformed material, one or more layers comprising one or more pluralities of adjacent fiber rovings comprising two or more of the fiber rovings are sandwiched between two or more layers of a thermoplastic polymer. In some embodiments, the preformed material comprises one or more beams comprising one or more of the fiber rovings. In some embodiments, one or more of the fiber rovings follows a portion of an external contour of the preformed material. In some embodiments of the preformed material, a first end of a roving faces the second end of a roving. In some embodiments, the preformed material comprises a first roving and a second roving wherein, in a portion where the first roving is parallel and adjacent to the second roving, the first end of the first roving faces the second end of the first roving at a first facing location and the second end of the second roving faces the second end of the second roving at a second facing location and wherein the second facing location is offset with respect to the first facing location along the length of the first roving.

DESCRIPTION OF EMBODIMENTS

Figure 1A:
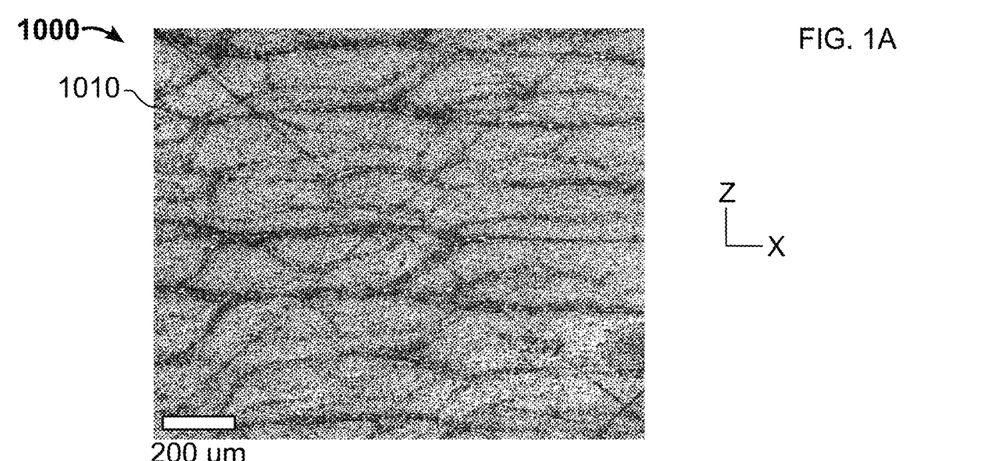
FIGS. 1A and 1B are images of a cross-sectional cut of a preformed material.
Figure 1B:
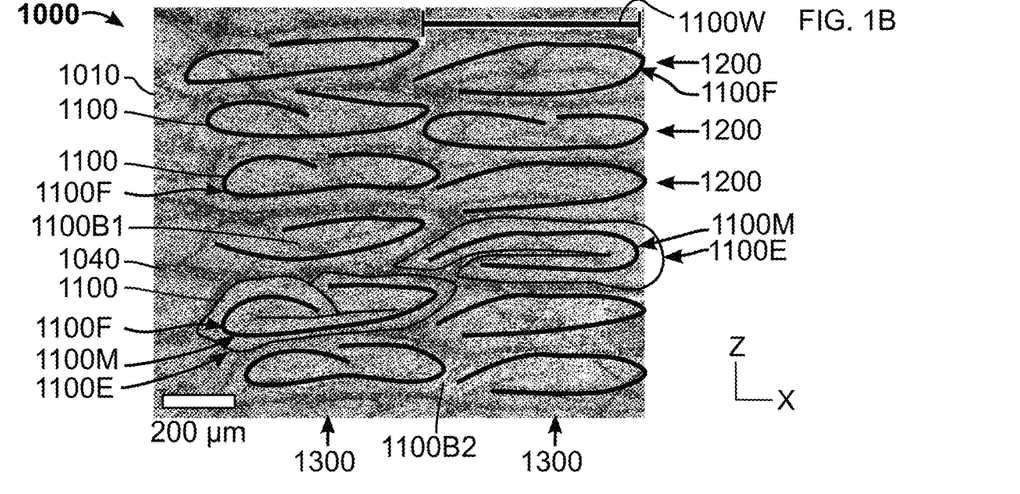

FIG. 1A presents an image acquired with, for example, an optical microscope of a cross-sectional cut 1010 of a preformed material 1000 for use in fiber-reinforced composite materials. For example, the preformed material 1000 comprises one or more fiber rovings that comprise one or more fibers selected from the group consisting of carbon fibers, glass fibers, polyaramide fibers, rayon fibers, acrylic fibers, polypropylene fibers, polyamide fibers, polyester fibers, polyetheretherketone fibers, silicon carbide fibers, alumina fibers, and alumina-silica fibers. The cross-sectional cut 1010 is, for example, formed by cutting the preformed material orthogonally to one or more fiber tows or rovings 1100 comprised in it. A method for acquiring an image of a cross-section comprises, for example, the steps of: i) forming a preformed material 1000 comprising one or more rovings 1100, for example rovings comprising a polymer, for example a thermoplastic polymer; ii) cutting the preformed material orthogonally to one or more fiber rovings 1100 to form a cross-section 1010; iii) grinding the exposed cross-section 1010; and iv) polishing the exposed cross section 1010. FIG. 1B is a replica of FIG. 1A wherein, for illustrative purposes, the cross-section 1010 of a plurality of rovings 1100 is marked. For a visualization example, the approximate thickness midline 1100M of each roving's cross-section is marked by a black line. The approximate scale of the image is shown with a white bar, the length of which is about 200 µm. For example, the preformed material 1000 has a fiber density comprised in a range from 10% to 75% of fibers by volume, for example from 45% to 60% of fibers by volume, for example from 55% to 60% of fibers by volume. For example, wherein the fiber density within the cross-sectional area defined by the contour of a roving is comprised in a range from 10% to 75% of fibers by volume, for example from 20% to 70% of fibers by volume.

The embodiment of a preformed material 1000 shown in FIGS. 1A and 1B comprises one or more rovings 1100 that comprise one or more folds 1100F in a direction parallel to the direction of the fibers comprised in the respective roving 1100. For example, a roving is a tow of fibers that are packed together, for example forming a roving having an approximately rectangular cross-section, for example in the form of a folded unidirectional tape of fibers having, in its unfolded tape configuration 1100TP shown in FIG. 2A, a first face FA1 and a second face FA2. For example, the tape material that is used to form the one or more rovings 1100 is a unidirectional preimpregnated tape 1100TP of fibers 100, also called "pre-preg", for example comprising a polymer, for example as a polymer adhesive, for example an epoxy resin, for example a thermoplastic polymer. In the rest of the description a polymer represents one or more adhesive materials, for example a polymer adhesive, for example one or more resins, for example an epoxy resin, for example a thermoplastic polymer.

For example, a fold 1100F describes a 180° fold wherein a portion of a face of a roving is brought into contact or brought to face another portion of the face of the roving. For example, a roving comprising one or more folds is a roving wherein one or more portions of a face of a roving is brought into contact or brought to face another portion of one or more of the first face and the second face of the roving. For example, the first face and the second face of the roving are bonded to each other by a bond 1100B1 of thermoplastic polymer, for example a thermoplastic polymer comprised in the roving. For example, the embodiment 1000 of FIGS. 1A and 1B shows rovings 1100 comprising one or two folds 1100F. In FIG. 1B, for illustrative purposes, the folds are indicated for a few selected rovings only and the lead lines point to a fold 1100F illustrated along the roving's midline 1100M. In practice, a fold can also be visualized or materialized by the shape, for example the convex curvature, of the external contour 1100E of a roving. For example, FIG. 1B highlights 12 rovings 1100 comprising folds photographed in the preformed material 1000. Six of the rovings comprise one fold 1100F. Six of the rovings comprise two folds 1100F.

A certain set of rovings comprising one or more folds 1100F and having a certain folded width 1100W present, for example, one or more useful improvements. For example, the speed at which the roving can be drawn to a specified position, for example by an additive manufacturing robot, is greater than with an unfolded roving.

Figure 8:
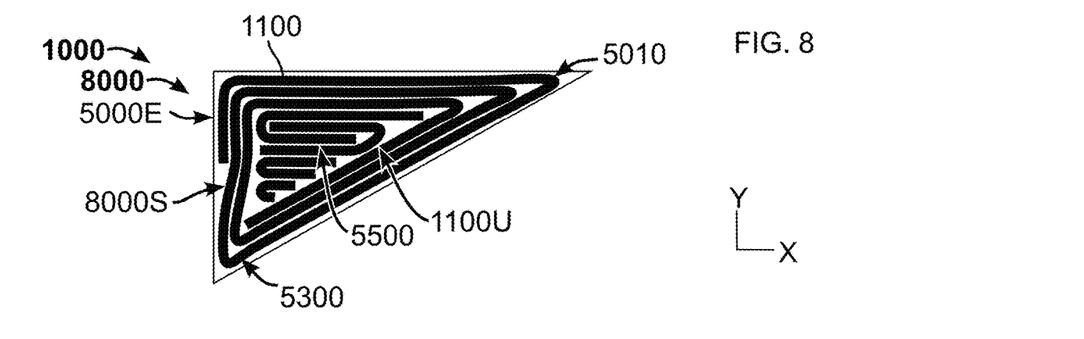
Figure 9:
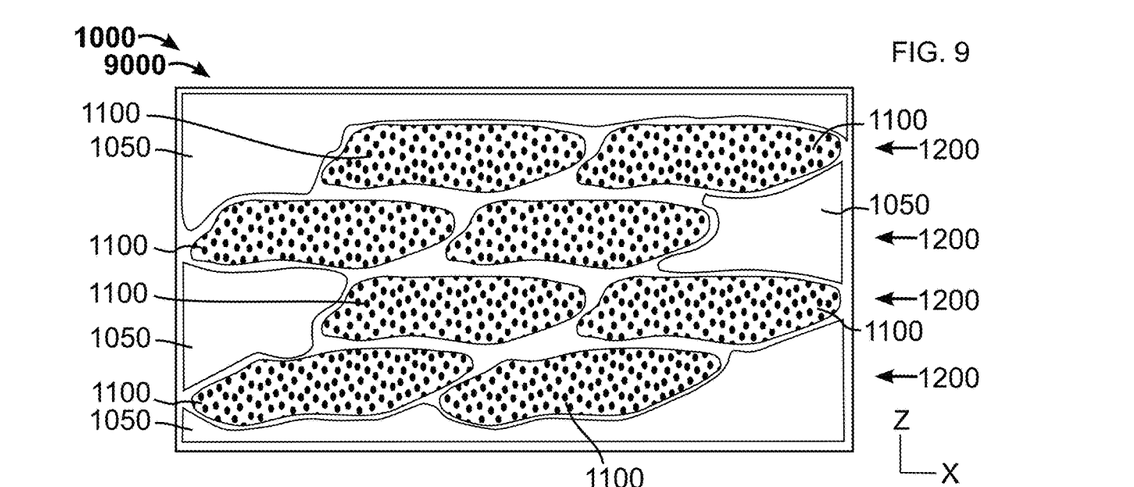
FIG. 9 is a cross-section of an alternate embodiment of a preformed material comprising folded rovings.

The embodiment of a preformed material 1000 shown in FIGS. 1A and 1B comprises a plurality of folded rovings arranged in rows or layers 1200 wherein, for example, a first roving comprises a portion of a face that is collinear with a portion of a face of a second roving on the row. For example, a plurality of folded rovings arranged in rows 1200 are adjacent to each other. For example, a plurality of folded rovings arranged in rows 1200 are parallel to each other. For example, one or more rovings 1100 form one or more turns (for example U-turns 1100U, for example interwoven U-turns 1100U) and loops to form parallel paths of rovings, as shown in FIG. 8. For example, a plurality of folded rovings are arranged in rows 1200 that are adjacent and parallel to each other. The embodiment of a preformed material 1000 shown in FIGS. 1A and 1B comprises a plurality of folded rovings arranged in columns 1300 wherein, for example, a first roving comprises a portion of a face that is stacked onto and parallel with a portion of a face of a second roving on the column. For example, the embodiment of a preformed material 1000 shown in FIGS. 1A and 1B comprises a plurality of folded rovings arranged in rows 1200 and stacked in columns 1300, in effect forming a rectangular square-packed lattice of folded rovings. Other regular arrangements are possible, for example an arrangement wherein the stacked rows present an offset with respect to each other, for example in the X-direction. For example, the offset from row-to-row has a constant increment. For example, the offset from row-to-row has an increment that is equal to about half the width, for example in the X-direction, of a folded roving, in effect forming a preformed material 1000 comprising an embodiment 9000 comprising a hexagonal-packed lattice of folded rovings, as shown in the embodiment of FIG. 9. In some embodiments of a preformed material 1000 comprising an offset of the stacking in one or more directions, the one or more arrangement gaps introduced by the offset are, for example, filled in with one or more of polymer 1050 and roving material, for example one or more folded rovings 1100.

In FIGS. 1A, 1B, for purpose of visualization, the external contour 1100E of two selected rovings 1100 is marked with a black line enveloping the roving. In FIGS. 1A, 1B, the external contour of one or more rovings is readily visualizable or detectable because at least a portion of the folded roving is separated from an adjacent roving by a visible layer of polymer 1040. In some embodiments, the polymer originates from the polymer that, for example, preimpregnates the rovings 1100 or the tape 1100TP used to form the roving 1100 prior to their assembly into the preformed material 1000. In other embodiments, the polymer is added upon bonding of the roving as part of a method 12000 for forming the preformed material 1000. In further embodiments, the polymer is added as a layer prior to bonding the roving 1100 to the preformed material 1000 as part of a method 12000 for forming the preformed material 1000.

Figure 2A:
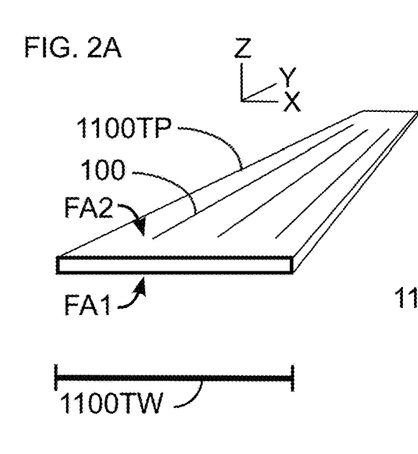
FIG. 2A is a perspective view of a tape comprising a plurality of fibers.

FIG. 2A shows a perspective view of a tape 1100TP comprising a plurality of fibers 100, for example parallel fibers. The tape 1100TP has, for example, a rectangular cross-section. For example, the tape 1100TP is a "pre-preg", for example preimpregnated with a polymer.

Figure 2B:
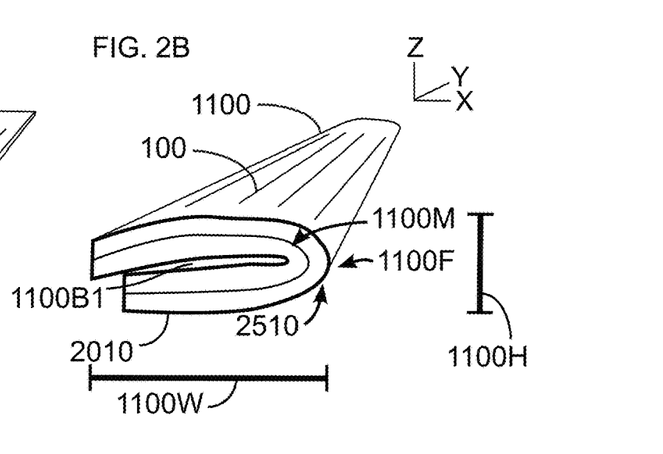
FIG. 2B is a perspective view of a folded roving.

FIG. 2B shows a perspective view of a folded roving 1100. The folded roving 1100 is, for example, formed by folding a tape 1100TP parallel to the direction of the fibers comprised in the roving 1100. The roving 1100 comprises a plurality of fibers 100, for example parallel fibers. FIG. 2B is not necessarily at the same scale as FIG. 2A. The midline 1110M into the thickness of the folded roving 1100 is represented, as shown in FIGS. 1B and 3A to 3H.

In FIGS. 1A, 1B, the width 1100W of the folded rovings 1100 comprised in the preformed material 1000 is, for example, in a range from about 0.8 mm to about 1.4 mm, for example from about 1 mm to about 1.2 mm. For example, the width 1100W of a folded roving comprised in an embodiment of a preformed material 1000 is comprised in a range from about 0.3 mm to about 2 mm, for example from about 0.5 mm to about 1.5 mm. For example, the developed length of the midline 1100M characterizing the width 1100TW of the unfolded roving tape 1100TP used to form the rovings is about 1 mm. For example, the width 1100TW of the unfolded roving tape 1100TP is comprised in a range from about 0.3 mm to about 5 mm, for example from about 0.4 mm to about 3 mm. For example, the thickness 1100H of a folded roving 1100 comprised in an embodiment of a preformed material 1000 is comprised in a range from about 30 µm to about 3 mm, for example from about 50 µm to about 1 mm, for example from about 100 µm to about 400 µm. For example, the rovings comprise from about 500 fibers to about 12,000 fibers, for example from about 1000 fibers to about 3000 fibers.

FIGS. 3A to 3H present different embodiments of folded rovings 1100. The embodiments 2010, 2020, 2030, 2040, 2050, 2060, 2070, 2080 are represented by the midline 1110M of the folded roving's cross-section. The folded rovings 2010, 2020, 2030, 2040, 2050, 2060, 2070, 2080 comprise one or more folds 1110F that are formed in a longitudinal direction of the folded roving 1110. In the rest of this description, the words roving and folded roving are used to represent a roving that comprises one or more folds. For generality, the number 1100 is used to represent the different embodiments of folded rovings. In a folded roving 1100, the one or more folds 1110F are, for example, formed parallel to the direction of the fibers comprised in the roving 1100. For example, the rovings 2010, 2020, 2030, 2040, 2050, 2060, 2070, 2080 are formed by one or more rolls and dies, for example as part of one or more of a roll-forming method and a pultrusion method that comprises passing a tape 1100TP through one or more rolls and dies.

Figure 3A:
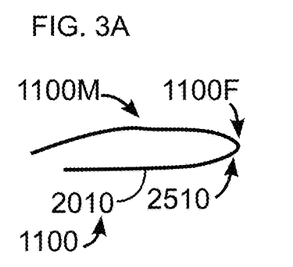
FIGS. 3A to 3H present midlines of cross-sections of embodiments of folded rovings.

For example, FIG. 3A presents a one-fold roving 2010 comprising only one first fold 2510. The fold 1100F, 2510 is, for example, formed halfway along the length of the midline 1100M of the roving tape used to form the folded roving 1100. For example, the fold 1100F is located about halfway of the unfolded width 1100TW of the roving 2010. In some embodiments of one-fold rovings 2010, the first fold 2510 is formed at a position that is shorter or longer that the halfway of the length of the midline 1110M. A roving comprises, for example, one or more of a first fold 2510 and a second fold 2520.

Figure 3B:
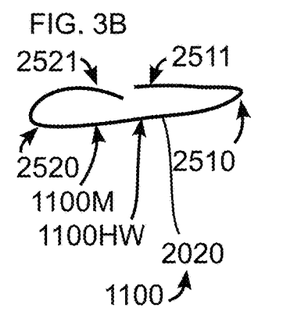
Figure 3C:
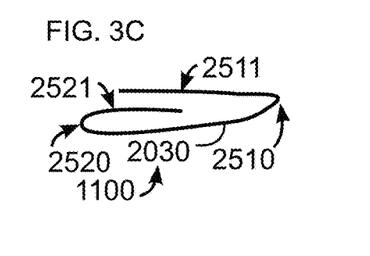
Figure 3D:
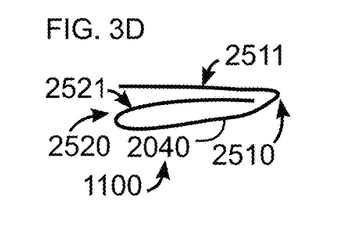
Figures 3E, 3H:
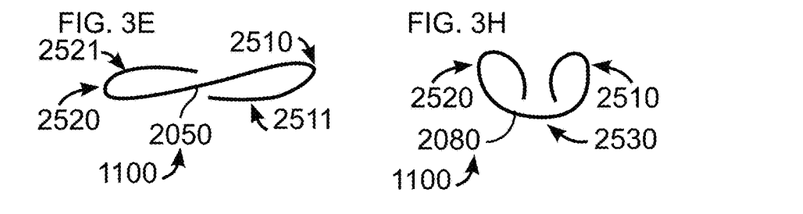

FIGS. 3B to 3E present various embodiments of two-fold rovings 2020, 2030, 2040, 2050. For example, FIG. 3B presents a gate-folded roving 2020. An embodiment of a gate-folded roving 2020 comprises, for example, a first fold 2510 and a second fold 2520. In the gate-folded roving 2020 of FIG. 3B the first flap 2511 formed by the first fold 2510 and the second flap 2521 formed by the second fold 2520 meet, for example, at about half the length of the midline 1110M. For example, some embodiments of two-fold rovings comprise a first fold 2510 and a second fold 2520 that are at about equal distance from the roving's half-width point 1100HW. For example, FIG. 3C presents a partly overlapping two-fold roving 2030, for example wherein the first flap 2511 partly overlaps a first face of the tape and partly overlaps the second flap 2521. FIG. 3D presents a fully overlapping two-fold roving 2040, for example comprising a letter fold, for example wherein the first flap 2511 completely overlaps the second flap 2521. FIG. 3E presents a version of an accordion fold roving 2050, for example wherein the first flap 2511 is folded over a first face FA1 and the second flap 2521 is folded over a second face FA2.

Figure 3F:
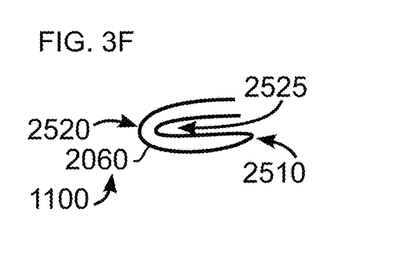
Figure 3G:
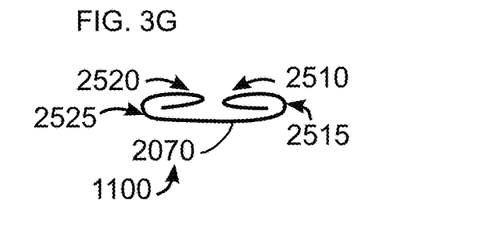

FIGS. 3F to 3H present various embodiments of rovings comprising more than two folds. For example, FIG. 3F presents a double parallel-folded roving 2060 that comprises three folds 2510, 2520, 2525 along its width. The double parallel-folded roving 2060 is, for example, formed by a method wherein a one-fold roving 2010 comprising a fold 2510 is folded a second time against itself to form folds 2520 and 2525. FIGS. 3G and 3H present two variants 2070 and 2080 of a gate-folded roving that comprise four folds 2510, 2515, 2520, 2525. For example, the first variant of a gate-folded roving 2070 and the second variant of a gate-folded roving 2080 comprise two folds at each side of the roving's width. For example, a method to form the first variant of a gate-folded roving 2070 comprises the steps of: i) forming a gate-folded roving 2020 comprising the step of folding a first flap 2511 delimited by a first fold 2510 onto a first face of the roving and folding, for example simultaneously, a second flap 2521 delimited by a second fold 2520 onto the first face of the roving; and ii) folding the first flap 2511 one or more times onto, for example, the first face, and folding the second flap 2521 one or more times onto, for example, the first face. The first variant 2070 comprises, for example, a fully overlapping two-fold at each side of the width of the roving. FIG. 3H presents, for example, a double-gate fold roving 2080 comprising, as in the gate-folded roving 2020, a first fold 2510 and a second fold 2520 and, between the first and second folds, a third fold 2530.

Figure 4:
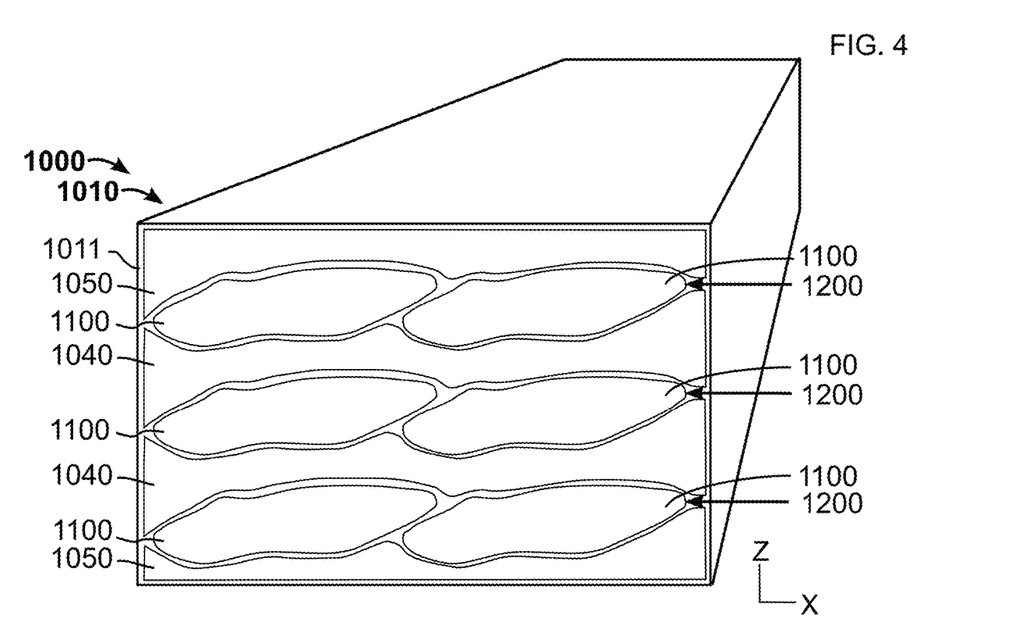
FIG. 4 presents a perspective view of sandwiched embodiment of a preformed material comprising folded rovings.

FIG. 4 presents a perspective view of a sandwiched embodiment 1011 showing a cross-sectional cut 1010 of a preformed material 1000 for use in fiber-reinforced composite materials, for example as a beam or part of a beam. For example, the sandwiched embodiment comprises one or more layers 1200 of rovings comprising one or more pluralities of adjacent rovings 1100 that are sandwiched between two or more layers of a polymer 1040, 1050, for example a thermoplastic polymer. Each layer 1200 comprises one or more rovings 1100 that comprise one or more folds 1100F, for example one or more rovings selected, for example, from one or more of the folded rovings 1100. In some embodiments of the preformed material 1000, for example the sandwiched embodiment 1011, the embodiment comprises one or more external polymer layers 1050, for example located at one or more peripheral faces of the embodiment 1000, 1010, 1011, for example cylindrically surrounding the embodiment 1000, 1010, 1011, for example enveloping the embodiment 1000, 1010, 1011.

Figure 5A:
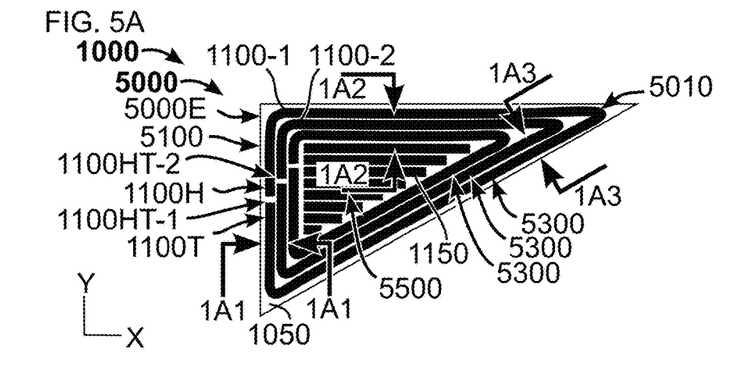
FIGS. 5A and 5B present a top view and a side view of a layout of an embodiment of a preformed material comprising folded rovings.
Figure 5B:
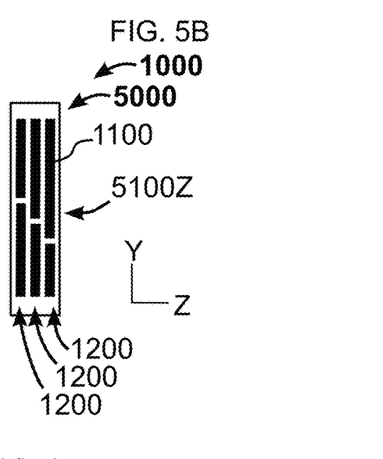

FIGS. 5A and 5B present respectively a top view into the X-Y plane and a side view into the Y-Z plane, for example, of a first layout of an embodiment 5000 of a preformed material 1000. For example, the first layout embodiment 5000 is representative of a cross-section through a preformed material 1000. For example, the first layout 5000 comprises one or more layers 1200 comprising rovings 1100, for example rovings comprising one or more folds 2010, 2020, 2030, 2040, 2050, 2060, 2070, 2080.

For example, the first layout comprises one or more rovings 1100, 5010 that follow a portion of an external contour 5000E of the preformed material 1000, for example of the first layout 5000, for example as a track 5300. In some embodiments, a track 5300 comprises, for example, a column of rovings 1300 (FIG. 1B), for example extending in the Z-direction. Another embodiment for a track 5300 comprises, for example, a stack of rovings 1300, for example arranged as a lattice, as shown in FIG. 9. Returning to the embodiment of FIG. 5A, the first layout 5000 comprises, for example, 3 parallel roving tracks 5300 in the X-Y plane, each comprising one or more rovings 1100. Other embodiments of the first layout 5000 comprise, for example, fewer or more parallel roving tracks 5300, for example comprised between zero and 10, for example 5. For example, the tracks 5300 are concentric. In an alternative embodiment 8000 (FIG. 8), the tracks 5300 comprise one or more tracks 5300 arranged in a spiral. For example, as shown in FIG. 5A, an embodiment of the first layout 5000 comprises parallel roving tracks 5300 along the entirety of the external contour 5000E. For a further example, as shown in FIG. 7, an embodiment 7000 of the first layout 5000 comprises parallel roving tracks 5300 along one or more first faces or sides of the external contour 5000E but not along other one or more second faces or sides of the external contour 5000E.

For example, a first end or head 1100H of a roving 1100 faces, for example contacts, the second end or tail 1100T of a roving 1100. For example, a first end or head 1100H of a roving 1100 faces the second end or tail 1100T of a roving 1100 at a facing location 1100HT, for example along an external contour 5000E of an embodiment of a preformed material 1000. For example, the facing location 1100HT-1 of a first roving 1100-1 is offset along the length of the first roving 1100-1 from the facing location 1100HT-2 of a second roving 1100-2 that is parallel, for example adjacent, to the first roving 1100-1. For example, the facing location 1100HT-1 of a first roving 1100-1 and the facing location 1100HT-2 of a second roving 1100-2 form a staggered arrangement 5100, for example a staircase arrangement. For example, a staggered arrangement 5100 comprises a first roving 1100-1 and a second roving 1100-2 wherein, in a portion where the first roving 1100-1 is parallel and adjacent to the second roving 1100-2, the first end 1100H of the first roving 1100-1 faces the second end 1100T of the first roving 1100-1 at a first facing location 1100HT-1 and the second end 1100H of the second roving 1100-2 faces the second end 1100T of the second roving 1100-2 at a second facing location 1100HT-2 and wherein the second facing location 1100HT-2 is offset with respect to the first facing location 1100HT-1 along the length of the first roving 1100-1. For example, in some embodiments, the offset distance is comprised in a range from 0.01 mm to 5 mm. For example, the rovings 1100 are arranged in a staggered arrangement in more than one plane. For example, FIG. 5A presents a first staggered arrangement 5100 in the X-Y plane and FIG. 5B presents a second staggered arrangement 5100 in the Y-Z plane. FIG. 5A further shows examples of sections 1A1, 1A2, 1A3 that correspond, for example, to the cross-sections presented in FIGS. 1A and 1B.

Figure 6:
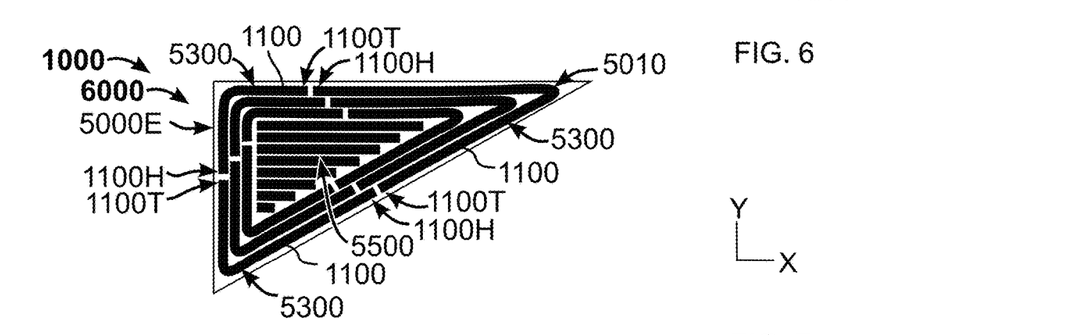
FIGS. 6, 7, and 8 present top views of alternate layouts of embodiments of a preformed material comprising folded rovings.
Figure 7:
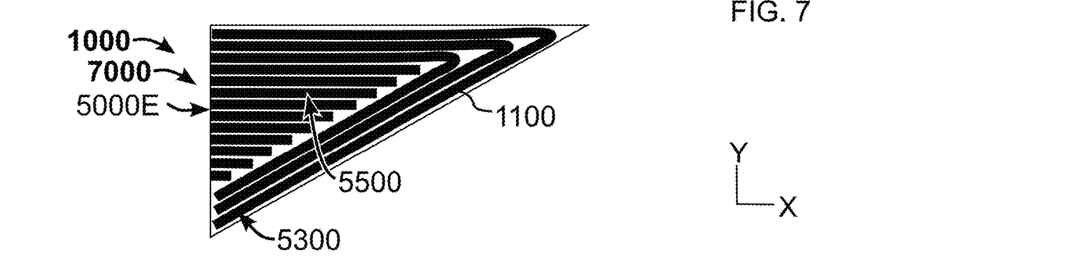

FIGS. 5A, 6, and 7 present an internal region 5500, also called an infill 5500, that fills the area or volume, for example in a plurality of stacked rows or layers 1200, comprised within the external contour 5000E of the preformed material 1000. For example, in FIG. 5A, the infill 5500 is, for example, completely surrounded by roving tracks 5300. In FIG. 7, the infill 5500 is, for example, partially surrounded by roving tracks 5300, for example along one or more sides of the infill 5500, for example along one or more sides and a portion of a side of the infill 5300. For example, the infill 5500 comprises separate fiber rovings 1150 that are parallel to each other.

Figure 13:
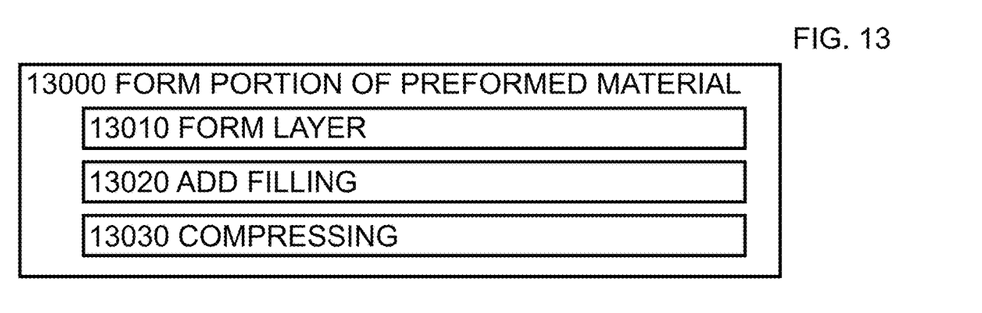
FIG. 13 is a block diagram of a method for forming portions of a preformed material.

FIG. 5A further presents an embodiment of the preformed material 1000 that comprises fillings 1050, for example comprising a polymer material, wherein no rovings 1100 are present. For example, a method 13000 for forming portions of a preformed material (block diagram in FIG. 13) comprises the steps: i) forming 13010 one or more layers 1200, for example a stack of layouts 5000; ii) adding 13020 one or more fillings 1050, for example as an addition of one or more polymers; and iii) compressing 13030 the material 1000, for example within a mold.

FIG. 5B presents a side view into the Y-Z plane, for example, of a first layout of an embodiment 5000 of the preformed material 1000 of FIG. 5A. FIG. 5B, presents a side view wherein the rovings 1100 present a staggered arrangement 5100Z within the thickness of the preformed material 1000, for example through two or more layers 1200 in the Z-direction, for example as depicted, in the Y-Z plane. For example, an embodiment of a preformed material comprises a set of rovings 1100 forming a first staggered arrangement 5100 in a first plane, for example the X-Y plane, and a second staggered arrangement 5100Z in a second plane, for example the Y-Z plane.

FIG. 6 presents an embodiment for a second layout 6000 as an alternative or a complement to the first layout 5000 embodiment presented in FIGS. 1A and 1B. The second layout comprises tracks 5300 each comprising one or more rovings 1100. For example, in FIG. 6 each track 5300 comprises 3 rovings 1100 in a head-to-tail arrangement. In the second layout 6000, for example, the head 1100H of a first roving 1100 of a first track 5300 joins, for example connects to, for example overlaps, the tail 1100T of a second roving. For example, the head 1100H to tail 1100T arrangement is repeated over a portion or the entirety of the external contour 5000E of the preformed material 1000. For example, the second layout 6000 presents a method to form a layer 1200 that complements the first layout with additional rovings at selected regions of the external contours.

FIG. 7 presents an embodiment for a third layout 7000 as an alternative or complement to the first layout 5000 embodiment presented in FIGS. 1A and 1B. In the third layout, the one or more roving 1100 of the one or more track 5300 is comprised on a portion of the external contour 5000E. For example, a portion of the external contour 5000E comprises rovings 1100 of the infill 5500 that intersect or contact the external contour 5000E, for example orthogonally to the portion of the external contour 5000E. For example, one or more roving 1100 of the track 5300 is parallel to one or more roving of the infill 5500. For example, the third layout 7000 presents a method to increase the strength along a selected direction within a selected region of a preformed material, for example a region defined as a layer 1200 that is comprised, for example comprised within a stack of layers 1200, within the first layout 5000. For example, an embodiment of the preformed material 1000 comprises one or more stacked layers 1200, for example formed from a layout 5000, 6000, 7000, 8000 of fiber rovings 1100, each layer 1200 comprising an arrangement of adjacent and parallel fiber rovings 1100. For example, an embodiment of the preformed material 1000 comprises one or more planar surface, for example a surface in the X-Y plane of the one or more layout 5000, 6000, 7000, 8000, for example formed from one or more layout 5000, 6000, 7000, 8000. For example, an embodiment of the preformed material 1000 is formed as a beam 1000, 1010. For example, an embodiment of the preformed material 1000 comprises one or more beam 1000, 1010, for example formed from one or more layout 5000, 6000, 7000, 8000.

FIG. 8 presents an embodiment for a fourth layout 8000, for example as an alternative or complement to the first layout 5000 embodiment presented in FIGS. 1A and 1B, wherein one or more track 5300 is arranged in a spiral 8000S. For example, the fourth layout 8000 comprises one or more roving to form a track 5300 arranged in a spiral 8000S. For example, a method to increase the speed at which a robot forms a preformed material 1000 by laying rovings 1100, for example the one or more roving 1100 of the one or more track 5300, for example in comparison to the concentric tracks 5300 of the first layout 5000, comprises depositing one or more roving 1100 to form a spiral 8000S. For example, an embodiment of a preformed material 1000 comprises one or more layer 1200 according to one or more of the first, the second, the third, and the fourth layout embodiments 5000, 6000, 7000, 8000, respectively.

Figure 10A:
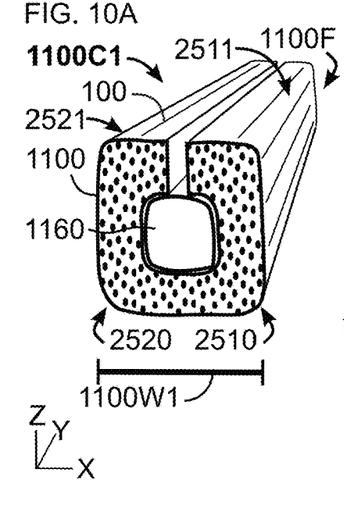
FIGS. 10A, 10B, and 10C are perspective views of embodiments of a folded roving comprising an additional polymer.
Figure 10B:
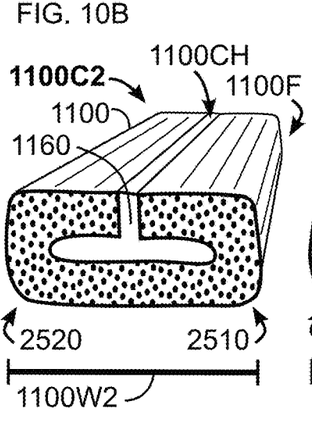
Figure 10C:
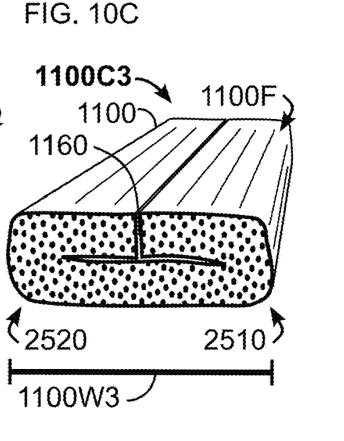

FIGS. 10A, 10B, and 10C present perspective views of a folded roving 1100, 1100C1, 1100C2, 1100C3 embodiment comprising an additional polymer 1160, for example between one or more of the first fold 2510 and the second fold 2520, for example between one or more of the first flap 2511 and the second flap 2521. FIG. 10A presents, for example, a first embodiment of a folded roving 1100C1 comprising one or more polymers 1160 enclosed within a roving folded as, for example, a gate-folded roving. The roving of FIG. 10A comprises, for example, a rounded rectangular cross-section of first width 1100W1, for example a square cross-section. The first width 1100W1 has, for example, a width in a range from 0.2 mm to 2.5 mm, for example from 0.3 mm to 1 mm, for example from 0.3 mm to 0.6 mm, for example 0.4 mm. For example, a width of the polymer 1160 is in a range from 0.05 mm to 1.8 mm. For example, the polymer 1160 is formed as a continuous line along the length of the roving 1100C1. In some embodiments, the polymer 1160 is formed, for example, as a dashed line along the length of the roving 1100C1.

FIG. 10B presents a second embodiment of a folded roving 1100C2 comprising polymer 1160 enclosed within a roving folded as, for example, a gate-folded roving. The second embodiment 1100C2 is, for example, formed as a variation of the first embodiment 1100C1 with a second width 1100W2 wherein the second width 1100W2, although comprised in the same ranges as that of the first width 1100W1 is greater than that of 1100W1. For example, a portion of polymer 1160 is comprised in a channel 1100CH between a first end and a second end of the width 1100TW of the tape 1100TP used to form the folded roving 1100, 1100C1, 1100C2, 1100C3. A method to form the second embodiment of a folded roving 1100C2 comprising polymer 1160 comprises, for example, the steps of: i) supplying the first embodiment of a folded roving 1100C1 comprising polymer 1160; and ii) pressing the first embodiment 1100C1 in one or more directions, for example the Z-direction. For example, the pressing comprises a step, for example simultaneous to pressing, of adding heat to the roving 1100C1, for example to melt the polymer 1160 comprised within it. For example, the pressing is comprised in a pultrusion method. For example, the pressing comprises applying pressure in the Z-direction, for example with one or more of: a shoe, for example a hot shoe; and a roller, for example a hot roller. For example, the channel 1100CH provides a method to enable excess polymer to escape from within the enclosure formed by the folded roving 1100C1, 1100C2 when the roving is pressed. For example, the pressing is simultaneous to the depositing of the folded roving 1100C1, 1100C2, 1100C3 during forming of the preformed material 1000. For example, the pressing occurs at the location where the folded roving 1100C1, 1100C2, 1100C3 contacts one or more of: a substrate onto which the preformed material 1000 is formed; and the preformed material 1000, for example previously deposited folded rovings 1100 comprised in the preformed material 1000. In some embodiments of the second folded roving 1100C2, pressing the folded roving causes polymer 1160 to diffuse between the fibers 100 of the roving 1100, for example as part of a method for forming a folded roving 1100 that has a fiber density that is lower than that of the tape 1100TP.

FIG. 100 presents a third embodiment of a folded roving 1100C3 comprising one or more polymers 1160 enclosed within a roving folded as, for example, a gate-folded roving. The third embodiment 1100C3 is, for example, formed as a variation of one or more of the first embodiment 1100C1 and the second embodiment 1100C2 with a third width 1100W3 wherein the third width 1100W3, although comprised in about the same ranges as that of the first width 1100W1 is, for example as a result of pressing, greater than that of 1100W1. In some of the third embodiments, the third width 1100W3 is greater than that of the second width 1100W2. A method to form the third embodiment of a folded roving 1100C3 comprising one or more polymers 1160 comprises, for example, supplying an embodiment of a folded roving 1100C1, 1100C2 comprising one or more polymers 1160 and pressing the embodiment 1100C1, 1100C2 in one or more directions, for example the Z-direction. For example, forming the third embodiment of a folded roving 1100C3 comprises supplying heat to the folded roving 1100C1, 1100C2, for example as for forming the second embodiment of a folded roving 1100C2. In some embodiments of the third folded roving 1100C3, pressing the folded roving causes polymer 1160 to diffuse between the fibers 100 of the roving 1100, for example forming a folded roving 1100 that, within the volume that encloses its fibers, comprises a greater polymer content than that of the tape 1100TP. In some embodiments 1100C1, 1100C2, 1100C3 of the folded roving comprising one or more polymers 1160, the gas content is lower than that of the tape 1100TP used to form the folded roving 1100. In some embodiments 1100C1, 1100C2, 1100C3 of the folded roving comprising one or more polymers 1160, the polymer content is lower than that of the tape 1100TP used to form the folded roving 1100.

For example, the method of forming the folded roving 1100, 1100C1, 1100C2, 1100C3 causes one or more of gases and excess polymer to be pressed out of the tape 1100TP used to form the folded roving. For example, the method of forming the folded roving 1100, 1100C1, 1100C2, 1100C3 comprises forming rovings comprising two or more proportions of polymer. For example, the method of forming the folded roving 1100, 1100C1, 1100C2, 1100C3 comprises forming rovings comprising two or more spatial distributions of polymer across, for example, the cross-section of the roving, for example along one or more of the X-direction and the Z-direction. For example, the method of forming the folded roving 1100, 1100C1, 1100C2, 1100C3 comprises forming rovings comprising two or more proportions of polymer along the length of the folded roving, for example in the Y-direction.

Figure 11:
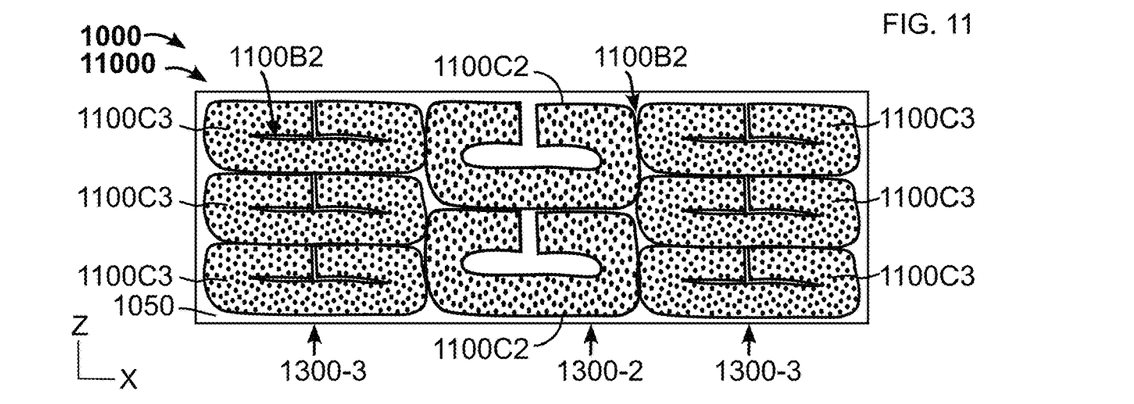
FIG. 11 is a cross-sectional view of an embodiment of a preformed material comprising a plurality of embodiments of folded rovings comprising a polymer enclosed within a folded roving.

FIG. 11 presents a cross-sectional view of an embodiment 11000 of a preformed material 1000 comprising a plurality of embodiments of folded rovings 1100C2, 1100C3 comprising a polymer 1160 enclosed within a folded roving. For example, the embodiment 11000 comprises a first plurality (for example comprising a plurality of rovings 1100C2) of a first folded roving 1100C2 embodiment comprising a first proportion of polymer 1160 and a second plurality (for example comprising a plurality of rovings 1100C3) of a second folded roving 1100C3 embodiment comprising a second proportion of polymer 1160. For example, the embodiment 11000 comprises embodiments of a first folded roving comprising a first spatial distribution of polymer 1160 and embodiments of a second folded roving comprising a second spatial distribution of polymer 1160. For example, the embodiment 11000 of a preformed material 1000 comprises a plurality of the second embodiment of a folded roving 1100C2 comprising polymer 1160 and a plurality of the third embodiment of a folded roving 1100C3 comprising polymer 1160. For example, the embodiment 11000 of a preformed material 1000 comprises alternating columns (or rows) 1300-2, 1300-3, each column (or row) comprising a first folded roving embodiment 1100C2 and a second folded embodiment 1100C3, respectively. For example, the embodiment 11000 of a preformed material 1000 comprises a first region 1300-2 comprising a first folded roving embodiment 1100C2 and a second region 1300-3 comprising a second folded roving embodiment 1100C3.

For example, the embodiment 11000 of a preformed material 1000 comprises a first region 1300-2 comprising a first proportion of one or more folded roving embodiments 1100C1, 1100C2, 1100C3, 2010, 2020, 2030, 2040, 2050, 2060, 2070, 2080 and a second region 1300-3 comprising a second folded roving embodiment 1100C3 comprising a second proportion of one or more folded roving embodiments 1100, for example folded roving embodiment 1100C1, 1100C2, 1100C3, 2010, 2020, 2030, 2040, 2050, 2060, 2070, 2080. For example, the embodiment 11000 of a preformed material 1000 comprises one or more second regions 1300-3 at the periphery of the preformed material 1000 that have one or more of a different fiber density, a different proportion of polymer 1160, and a different spatial distribution of polymer 1160 than that of one or more first regions 1300-2 located closer to the geometric center of the preformed material 1000 than the second regions 1300-3. For example, in some embodiments of the preformed material 1000 the one or more first regions 1300-2 are surrounded, for example along one or more axes, X, Y, and Z, by one or more second regions 1300-3. For example, in some embodiments of the preformed material 1000 the one or more first regions 1300-2 comprising first folded roving embodiments 1100C2 having a first fiber density are surrounded by second regions 1300-3 comprising second folded roving embodiments 1100C2 having a second fiber density that is greater than the first fiber density. The fiber density is, for example, a density by volume. For example, for an embodiment of a preformed material 1000 comprised of one or more polymers and fibers, the fiber density of the second regions 1300-3 is greater in a range from 10% to 1000%, for example in a range from 20% to 200%, than the density of the first regions 1300-2. Some embodiments of a preformed material 1000 comprise, for example, other materials, for example a foam, for example a polystyrene foam, and the density of the second regions 1300-3 is greater than ten times that of the first regions 1300-2. For example, an embodiment of a preformed material 1000 is formed as a sandwich wherein one or more first regions 1300-2 are sandwiched between two or more second regions 1300-3.

Figure 12:
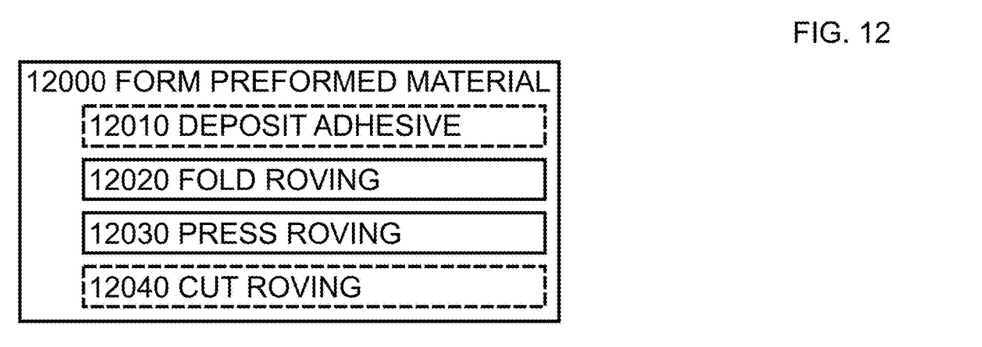
FIG. 12 is a block diagram of a method for forming a preformed material.

FIG. 12 presents a block diagram of a method 12000 to form a preformed material 1000. In some embodiments of the method 12000, the method comprises, for example, a step 12010 of depositing one or more polymers 1050 onto a fiber roving 1100, for example a tape 1100TP that comprises fibers 100. The polymer 1050 is deposited, for example, on one or more faces FA1, FA2 of the tape 1100TP.

The method 12000 comprises, for example, a step 12020 of folding the roving 1100, for example folding the tape 1100TP, into one or more of a folded roving embodiment 1100, 1100C1, 1100C2, 1100C3, 2010, 2020, 2030, 2040, 2050, 2060, 2070, 2080. For example, in an embodiment of the method 12000 to form a preformed material 1000 that comprises a step 12010 of depositing a polymer 1050, the step of depositing 12010 and the step of folding 12020 occur simultaneously.

The method 12000 comprises, for example, a step 12030 of pressing the roving 1100. For example, the step of pressing 12030 the roving comprises positioning a portion of the roving onto a substrate or onto a portion of the preformed material 1000. The step of pressing 12030 comprises, for example, pressing the roving in one or more directions, for example the Z-direction. For example, the pressing 12030 comprises adding heat to the roving, for example to melt the polymer comprised at one or more of: a location adjacent to the roving, for example on the substrate; a location on the roving, for example at one or more of the roving's surfaces; and within the roving. For example, the pressing 12030 is simultaneous to a pultrusion process applied to the roving. For example, the pressing 12030 comprises applying pressure in the Z-direction, for example with one or more of: a shoe, for example a hot shoe; and a roller, for example a hot roller.

The method 12000 comprises, for example, a step 12040 of cutting the roving 1100. For example, the step of cutting 12040 the roving comprises one or more of: a transverse cut, for example in a direction orthogonal to that of the fibers 100 comprised in the roving 1100; a bevel cut; and a circular cut, for example comprising a circular motion around the roving's fibers. In some embodiments of the method 12000, following the cut, the deposited remaining end of the roving, for example the roving's tail 1100T, is, for example, subjected to a further pressing step 12030. Subsequently, the other end of the roving 1100 is, for example a roving's head 1100H. The roving's head 1100H is positioned to another location, for example one or more of adjacent to and superimposed onto, a previously deposited roving 1100, and the sequence of steps comprising one or more of i) depositing 12010, ii) folding 12020, iii) pressing 12030, and iv) cutting 12040 is repeated or continued. In some embodiments of the method 12000 for forming a preformed material, one or more of the steps 12010, 12020, 12030, 12040 occur simultaneously, for example at different locations along the length of the roving 1100. For example, the thermoplastic polymer comprised in the tape 1100TP contributes to form i) one or more first bonds 1100B1 within the one or more folds 2510, 2515, 2520, 2525 of the rovings 1100; and ii) one or more second bonds 1100B2 between a first roving 1100 and a second adjacent roving 1100 (FIG. 1A and FIG. 11).

Figure 14A:
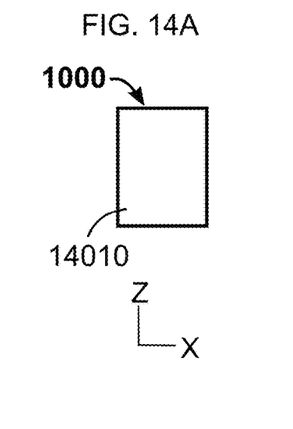
FIGS. 14A, 14B, and 14C are cross-sections of embodiments of a preformed material comprising one or more preformed materials.
Figure 14B:
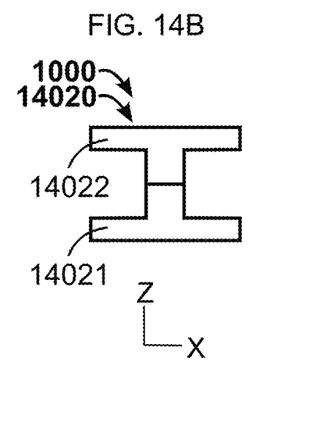
Figure 14C:
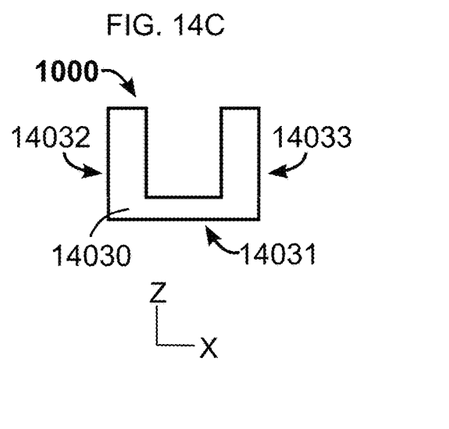

FIGS. 14A, 14B, and 14C present cross-sections of embodiments of a preformed material 1000, for example comprising one or more preformed materials 1000. FIG. 14A presents the cross-section of a rectangular beam 14010, for example formed from one or more preformed material embodiments 1000, 1010, 5000, 6000, 7000, 9000, 11000. FIG. 14B presents the cross-section of an I-beam 14020, for example comprising a first preformed material 14021 shaped as a first T-beam bonded to a second preformed material 14022 shaped as a second T-beam. For example, a first preformed material 14021 and a second preformed material 14022 have a same cross-section. FIG. 14C presents the cross-section of a channel beam 14030. For example, the channel of the channel beam 14030 is formed from one or more planar preformed material embodiments 14031. For example, the preformed material embodiment 14031 comprises a rectangular cross section, for example the preformed material embodiments 1010, 5000, 6000, 7000, 9000, 11000, onto which a first rectangular beam 14010 is added or formed as a first side pillar 14032 of the channel and a second rectangular beam 14010 is added or formed as a second side pillar 14033 of the channel. For example, the side pillars 14032, 14033 are formed as continuation steps in an additive manufacturing process comprising forming a stack of folded rovings, each stack comprising a plurality of folded rovings 1100.

For example, an embodiment of a preformed material 1000 comprises one or more folded rovings 1100 and one or more tapes 1100TP. For example, an embodiment of a layout 5000, 6000, 7000, 8000 comprises one or more folded rovings 1100 and one or more tapes 1100TP. For example, the one or more folded rovings 1100 and the one or more tapes 1100TP are positioned parallel to each other. For example, the one or more folded rovings 1100 and the one or more tapes 1100TP comprise a portion of their length that is parallel to each other.

It has been found that embodiments of a preformed material 1000 formed from one or more folded roving embodiments 1100, 1100C1, 1100C2, 1100C3, 2010, 2020, 2030, 2040, 2050, 2060, 2070, 2080 are formed with greater speed and with more precise control and repeatability of structural characteristics and material strength than embodiments formed from one or more of unfolded fiber tapes 1100TP and fiber filaments having a circular cross-section. It is believed that one or more factors associated with the folded rovings 1100 and their aforementioned cross-sectional dimensions contribute improvements. For example, the method 12000 comprising folding 12020 and pressing 12030 the tapes 1100TP contributes to reducing the number and size of voids, for example voids comprising gas or excess polymer initially comprised within the unprocessed tapes 1100TP. For example, it has been found that a preformed material 1000 comprising folded rovings 1100 has less than 20% of void content in regions where the folded rovings form curved paths. For example, it has been found that a preformed material 1000 comprising folded rovings 1100 has less than 10% of void content in regions where the folded rovings form straight paths. For example, it has been found that a preformed material 1000 comprising folded rovings 1100 and having undergone a compression molding stage comprises a void content in the range of 0.5% to 2%.

It has been found that a preformed material that is, for example, manufactured from fiber filaments comprising a circular cross section, suffers from the same internal excess of gas and polymer as a preformed material manufactured from unidirectional tapes 1100TP but with the additional inconvenient of additional thickness which requires greater heat addition and greater heating time to reduce the voids within one or more of the filament and the resulting preformed material.

Furthermore, it has been found experimentally that folded rovings can be deposited faster and form paths of smaller radii of curvature than tapes 1100TP or filaments having a circular cross section. For example, the radius of curvature of a continuous path (without kinks or folds) taken by a roving 1100 comprising from 500 to 12000 fibers, for example from 1000 to 3000 fibers, is as small as 1 mm, for example 2 mm. It is believed that the smaller cross-sectional dimensions of the folded rovings 1100, the more even heat distribution within the folded rovings 1100, and the rounded external geometry at the location the folds 1110F, 2510, 2520 contributes greater flexibility and swiveling, possibly assisted by intra-fold sliding or rearrangement, and ease of self-adjusting upon depositing the folded roving 1100 than when using tapes with a rectangular cross-section or filaments with a circular or elliptical cross-section.

Furthermore, it is believed that the folds 1110F, 2510, 2515, 2520, 2525, because they are uniformly hot during deposition, enable some readjustment of the length of the flaps 2511, 2521 during deposition to form curved paths, hence providing rovings with greater flexibility than conventional tapes or filaments. It is further believed that since forming and depositing folded rovings reduces the gas content and the uneven distribution of polymer material within the rovings, greater control of the spatial uniformity of fibers within the preformed material 1000 are obtained. For example, if the preformed material 1000 is to undergo a step of compression molding 13030, greater control of the redistribution of fibers and polymer are obtained and therefore greater control of one or more of the structural characteristics, the overall strength, and the local strengths of the final product are obtained.

While the foregoing is directed to embodiments of the present disclosure, other and further embodiments of the invention may be devised without departing from the basic scope thereof. Therefore, the scope of the present disclosure is determined by the claims that follow.

The invention claimed is:

1. A preformed material for use in fiber-reinforced composite materials, the preformed material comprising:
   one or more fiber rovings each having parallel fibers, each fiber roving preimpregnated with a polymer material in which the parallel fibers are disposed and bound together thereby, and each having a selected fold arrangement comprising one or more folds, with each fold extending a full length of the fiber roving in a direction parallel to the direction of the fibers, wherein at each fold the fiber roving is folded onto itself such that a portion of a face of the roving faces or contacts another portion of the face of the roving.

2. The preformed material of claim 1, wherein an unfolded width of each of the one or more fiber rovings has a width in a range from 0.3 mm to 5 mm.

3. The preformed material of claim 1, wherein the one or more fiber rovings each have one or more folds selected from the group consisting of: a one-fold, a gate-fold, a partly overlapping two-fold, a fully overlapping two-fold, an accordion fold, a double parallel-folded, and a gate-folded that includes four folds.

4. The preformed material of claim 1, wherein one or more of the fiber rovings have only one fold that is located about halfway of an unfolded width of the one or more fiber rovings.

5. The preformed material of claim 1, wherein the one or more fiber rovings have only two folds including a first fold and a second fold that are at about equal distance from a half-width point of the one or more fiber rovings.

6. The preformed material of claim 1, wherein a cross-sectional cut through the preformed material orthogonally to a direction of fibers of one or more of the one or more fiber rovings includes one or more rovings including one or more folds.

7. The preformed material of claim 1, wherein the preformed material has a fiber density by volume in a range from 10% to 75% of fibers.

8. The preformed material of claim 1, wherein a thickness of a fiber roving is in a range from 50 μm to 2 mm.

9. The preformed material of claim 1, wherein a fiber density by volume within a cross-sectional area defined by an external contour of one of the one or more fiber rovings is in a range from 20% to 75% of fibers.

10. The preformed material of claim 1, wherein the preformed material includes one or more layers including one or more of the fiber rovings, each layer including an arrangement of adjacent and parallel fiber rovings.

11. The preformed material of claim 1, wherein each of the one or more fiber rovings include from 500 to 12000 fibers.

12. The preformed material of claim 1, wherein each of the one or more fiber rovings have a width in a range from 0.2 mm to 2.5 mm.

13. The preformed material of claim 1, wherein each of the one or more fiber rovings include one or more fibers selected from the group consisting of: carbon fibers, glass fibers, polyaramide fibers, rayon fibers, acrylic fibers, polypropylene fibers, polyamide fibers, polyester fibers, polyetheretherketone fibers, silicon carbide fibers, alumina fibers, alumina-silica fibers, and a combination thereof.

14. The preformed material of claim 1, wherein one or more of the one or more fiber rovings includes a thermoplastic polymer forming a first bond within the one or more folds and forming a second bond between a first fiber roving and a second fiber roving adjacent to the first fiber roving.

15. The preformed material of claim 1, wherein the preformed material includes one or more layers including one or more of the fiber rovings; wherein the one or more layers includes one or more plurality of adjacent fiber rovings; wherein two or more of the fiber rovings are sandwiched between two or more layers of a thermoplastic polymer.

16. The preformed material of claim 1, further including one or more beams including the one or more fiber rovings.

17. The preformed material of claim 1, wherein the one or more fiber rovings follow a portion of an external contour of the preformed material.

18. The preformed material of claim 1, wherein the one or more fiber rovings include a first roving and a second roving; further wherein a first end of the first roving faces a first end of the second roving.

19. The preformed material of claim 1, wherein at least a portion of the fiber roving comprises one or more U-turns in a path of the fiber roving.

20. The preformed material of claim 19, wherein the U-turns are arranged in rows that are adjacent and parallel to each other.

21. The preformed material of claim 1, wherein the fold arrangement of a first fiber roving has a fold arrangement different from the fold arrangement of a second fiber roving.

22. The preformed material of claim 1, wherein one or more of the fiber rovings comprise a thermoplastic polymer.

23. A preformed material for use in fiber-reinforced composite materials, the preformed material comprising:
   one or more fiber rovings including parallel fibers, wherein the one or more fiber rovings each have one or more folds in a direction parallel to the direction of the fibers, and wherein the preformed material includes one or more stacked layers including one or more of the fiber rovings, each layer including an arrangement of adjacent and parallel fiber rovings.

24. A preformed material for use in fiber-reinforced composite materials, the preformed material comprising:
   one or more fiber rovings including parallel fibers, wherein the one or more fiber rovings each have one or more folds in a direction parallel to the direction of the fibers, the one or more fiber rovings including:
   a first roving having a first end and a second end, and
   a second roving having a first end and a second end;
   wherein a portion of the first roving is parallel and adjacent to the second roving and wherein, in the portion, the first end of the first roving faces the second end of the first roving at a first facing location and the second end of the second roving faces the second end of the second roving at a second facing location; and wherein the second facing location is offset with respect to the first facing location along the a length of the first roving.

* * * * *